United States Patent [19]
Bright et al.

[11] Patent Number: 5,381,963
[45] Date of Patent: Jan. 17, 1995

[54] PROJECTION WELDED NEEDLE GUIDE

[75] Inventors: John S. Bright; Gyula A. Huszar, both of Newport News; Dean L. Spiers, Hampton, all of Va.

[73] Assignee: Siemens Automotive L.P., Auburn Hills, Mich.

[21] Appl. No.: 80,277

[22] Filed: Jun. 21, 1993

[51] Int. Cl.$^6$ .............................................. B23K 13/00
[52] U.S. Cl. ..................... 239/533.2; 219/93
[58] Field of Search .................. 219/50, 56, 117.1, 43, 219/91.23; 29/DIG. 48; 239/533.3–533.12, 585.1–585.5

[56] References Cited

U.S. PATENT DOCUMENTS

| | | | |
|---|---|---|---|
| 1,872,394 | 8/1932 | Bleicher | 219/93 |
| 1,977,567 | 10/1934 | Eksergian | 219/93 |
| 2,400,683 | 5/1946 | Burnett | 219/93 X |
| 3,598,952 | 8/1971 | Roberson | 219/93 X |
| 4,495,397 | 1/1985 | Opprecht et al. | 219/93 |
| 5,127,156 | 7/1992 | Yokoyama et al. | 29/890.142 X |

*Primary Examiner*—Andres Kashnikow
*Assistant Examiner*—Kevin Weldon
*Attorney, Agent, or Firm*—George L. Boller; Russel C. Wells

[57] ABSTRACT

Projection welding is used to join a needle guide member and a valve seat member together preparatory to their assembly into the nozzle of a fuel injector. Various embodiments are disclosed, including various ways for creating the projections. In the preferred embodiment the projections on the end face of the guide member are made my forming a small holes in the frustoconical surface of the guide plate. As the tool is used to form the small holes in the guide plate, the material of the guide plate is displaced creating small projections from the frustoconial guide surface.

20 Claims, 3 Drawing Sheets

PROJECTION WELDED NEEDLE GUIDE

FIELD OF THE INVENTION

This invention relates generally to fluid valves, particularly fuel injectors, and to methods relating to the manufacture of such valves.

BACKGROUND AND SUMMARY OF THE INVENTION

One type of fuel injector that is used for injecting fuel into an internal combustion engine comprises a valve element in the form of a needle that is reciprocated by an operating mechanism to seat on and unseat from a valve seat member thereby alternately closing and opening a passageway through it. For aiding in guiding the reciprocation of the needle, a needle guide member is disposed proximate the valve seat member.

The present invention relates to a new way to join a needle guide member and a valve seat member together.

First, it should be recognized that certain needle guide members and valve seat members are already commonly joined by using machined fixtures, pressing, clamping, laser welding, or resistance welding. Welding of a needle guide member to a valve seat member in a precise locating fixture is superior to other methods in cost and/or precision. Resistance welding works well when the design of the components is suitable and the contact area is small. The present invention solves the problem of welding these components when their design is not suitable for the previous techniques.

Because of valve functional requirements, the design of the two components for which the present invention has been developed requires that they have relatively large flat surface areas that mutually abut. They cannot be successfully resistance welded because the manufacturing techniques employed to fabricate them do not consistently produce surfaces of sufficient flatness for resistance welding to be suitable. Attempts to resistance weld these surfaces are apt to result in distortions of the components which although seemingly small are nevertheless sufficiently large that they may impair proper functionality of a precision device like a fuel injector.

The present invention comprises creating raised projections in one of the two parts for abutting the other part preparatory to applying current through the abutted parts. The projections concentrate the welding energy for producing resulting strong welds while reducing the total weld energy used so that the parts do not distort to a degree that impairs their proper functionality in a fuel injector. They provide consistent, well-defined contact areas so that the welds can be consistently accurate placed at desired circumferential increments around the co-axis of the two abutted parts. Three projections are used so that three-point abutment is consistently assured irrespective of slight irregularities in flatness of the surface containing them and in flatness of the surface which they abut.

The creation of the projections by machining is not economical. Molding and coining are the preferred ways to create them. It is also possible for projections to be provided in a separate part that is disposed between the valve seat member and the needle guide member so that projections engage both parts.

Details of a presently preferred embodiment of the invention will be described with reference to the following description which is accompanied by the following drawings presenting the best mode for carrying out the preferred embodiment at this time.

DESCRIPTION OF THE PREFERRED EMBODIMENT

Figure 1:
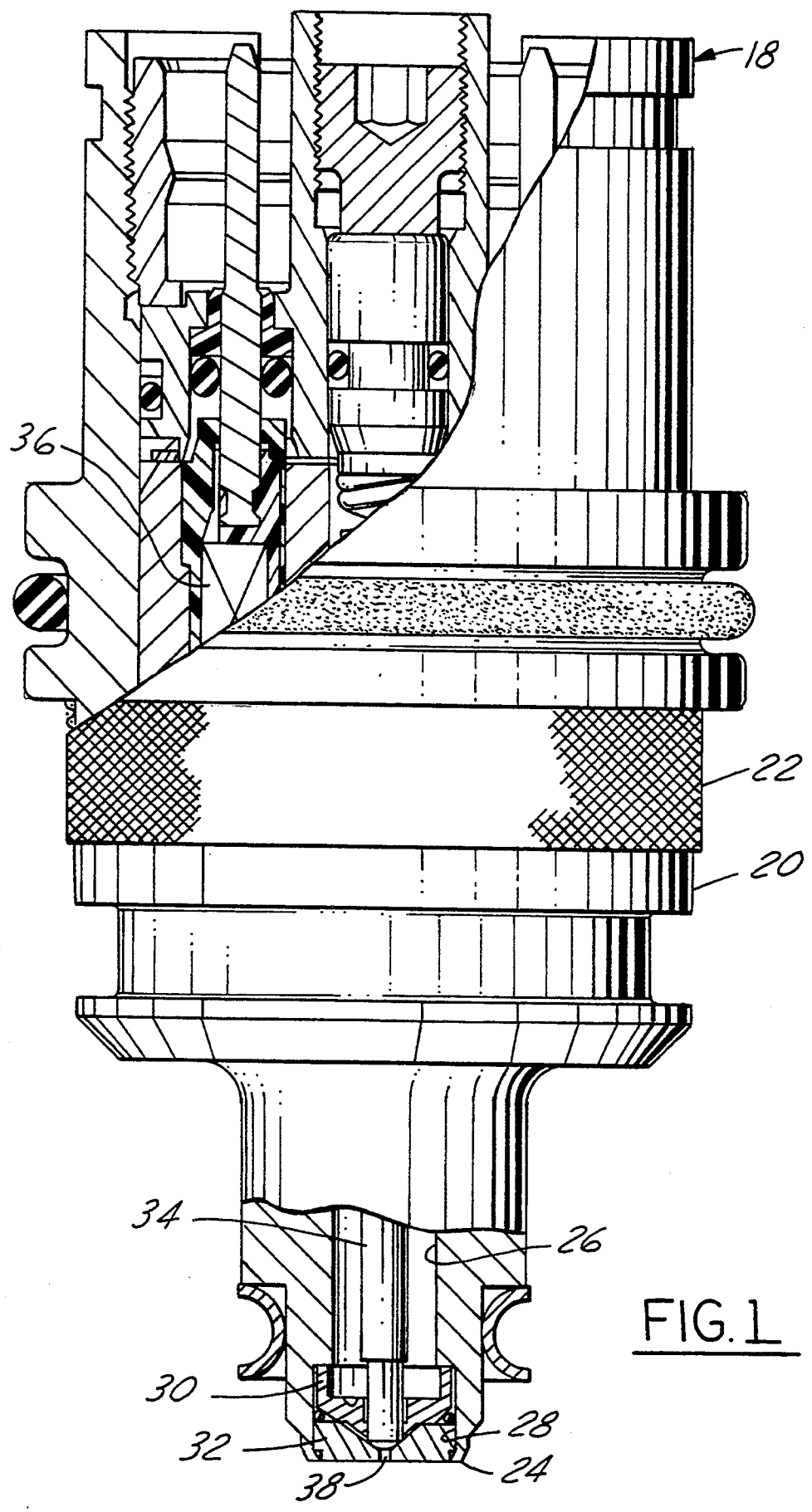
FIG. 1 is an elevational view, portions being in cross section, of an exemplary fuel injector embodying a construction resulting from the application of principles of the invention.

FIG. 1 shows a representative fuel injector 18 that has been fabricated through use of principles of the invention. Fuel injector 18 comprises a body 20 having a side inlet 22 through which fuel enters and a bottom nozzle 24 from which fuel is injected. An internal passageway 26 for the conveyance of fuel through the fuel injector extends from inlet 22 to nozzle 24, and its final length is seen in FIG. 1 just before nozzle 24. Nozzle 24 comprises a counterbore 28 containing a needle guide member 30 and a valve seat member 32 in a fixed mounting on the body. The distal end of a needle valve member 34 is guided by guide member 30, and the rounded tip end of member 34 seats on and unseats from a frustoconical seat formed centrally in member 32 as member 34 is axially reciprocated by an actuating mechanism that comprises a solenoid 36. When member 34 is seated on member 32, flow through an injection orifice 38 in member 32 is blocked. When member 34 is unseated from member 32, fuel can flow to be injected from the nozzle. The present invention relates to joining members 30 and 32 together in assembly before they are assembled into counterbore 28.

Figure 2:
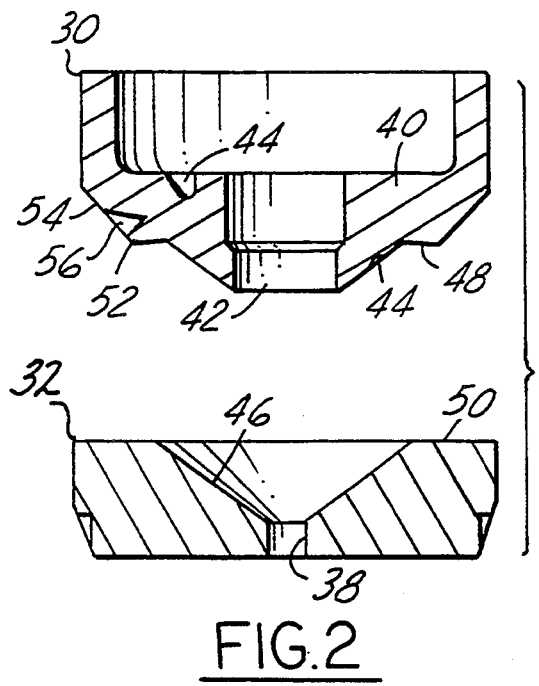
FIG. 2 is an enlarged cross section of two of the components of the fuel injector by themselves prior to assembly.
Figure 3:
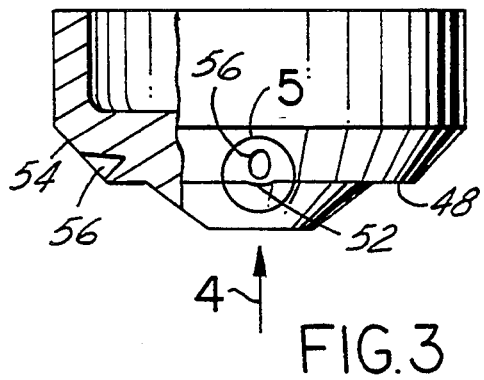
FIG. 3 is a view of one of the components of FIG. 2 by itself, but with a smaller portion cross sectioned away than in FIG. 2.
Figure 4:
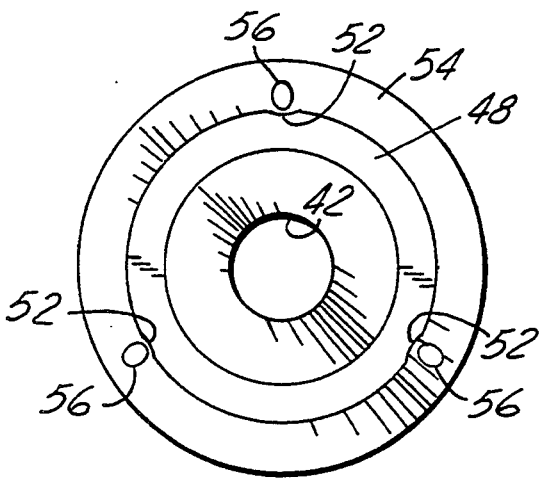
FIG. 4 is a full bottom view in the direction of arrow 4 in FIG. 3.
Figure 5:
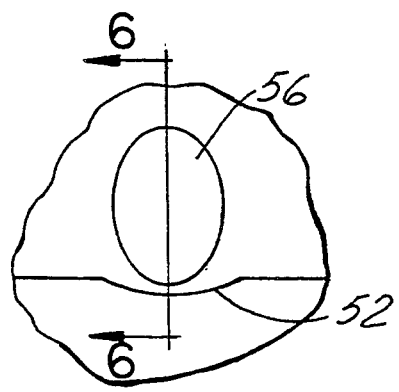
FIG. 5 is an enlarged fragmentary view in clircle 5 in FIG. 3.
Figure 6:
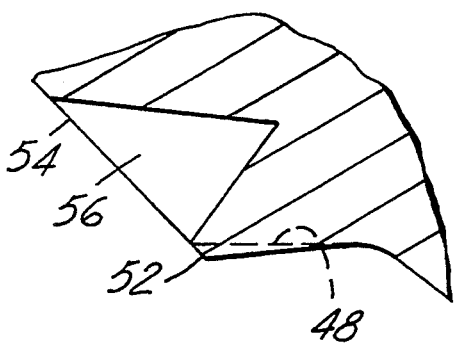
FIG. 6 is a fragmentary cross sectional view in the direction of arrows 6—6 in FIG. 5.
Figure 7:
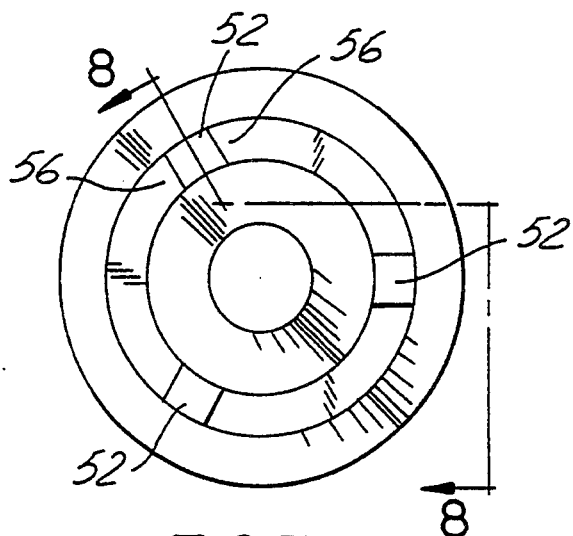
FIG. 7 is a view similar to FIG. 4 showing a modified form.
Figure 8:
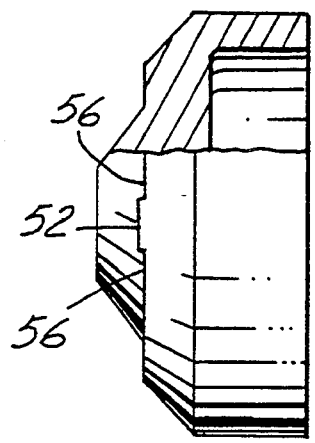
FIG. 8 is cross sectional view in the direction of arrows 8—8 in FIG. 7.
Figure 9:
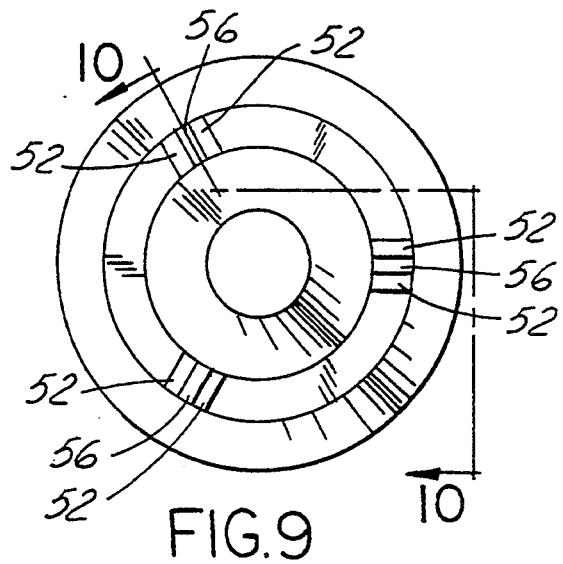
FIG. 9 is a view similar to FIG. 4 showing another modified form.
Figure 10:
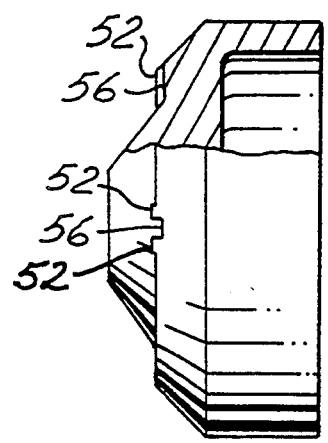
FIG. 10 is cross sectional view in the direction of arrows 10—10 in FIG. 9.
Figure 11:
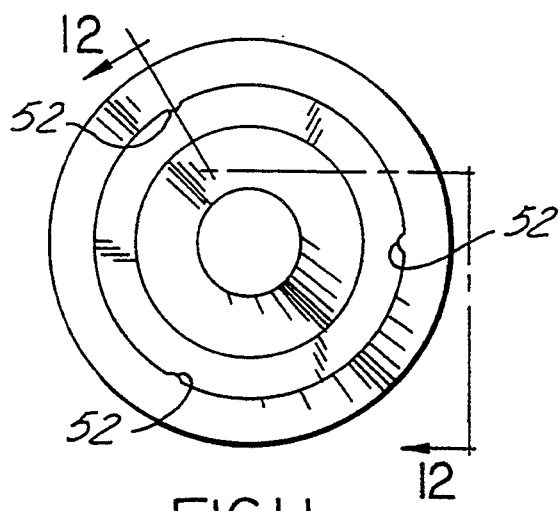
FIG. 11 is a view similar to FIG. 4 showing still another modified form.
Figure 12:
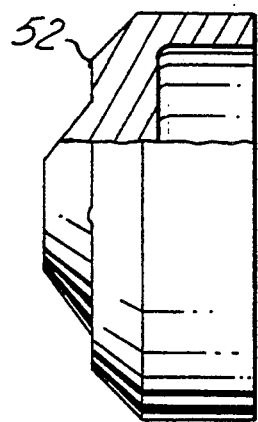
FIG. 12 is cross sectional view in the direction of arrows 12—12 in FIG. 11.

FIG. 2 shows members 30 and 32 by themselves in greater detail prior to being joined. Member 30 has a transverse wall 40 that contains a central guide hole 42 for guiding member 34. It also contains several slant swirl holes 44 for fuel to pass through to the frustoconical seat of member 32 which is designated 46.

Members 30 and 32 have respective surface portions that are complementary to each other and that confront each other in the completed assembly of members 30 and 32. They include a nominally flat, annular, transverse surface 48 in member 30 and a nominally flat, annular transverse surface 50 in member 32. It is via these surfaces that the two members are to be joined.

In accordance with certain principles of the invention, three circumferentially spaced projections 52 are provided in member 30. When the two members 30 and 32 are coaxially aligned as in FIG. 2 and then axially forced together, projections 52 will contact surface 50 thereby providing a three-point contact of member 30 with member 32. Members 30 and 32 are steel, and so can be welded. Therefore, when they are clamped in a welding fixture that passes electric current between them, the current path through them will include the three projections 52. A sufficient amount of current will cause the projections to melt, and when the current stops, the melted projections are allowed to cool and solidify into welds that hold the two members together.

Each of the projections is created by tooling which comprises a pointed tip that is advanced into a frustoconical surface 54 adjoining surface 48. As the tool creates a small hole, or depression, 56 in that surface, material of the member is displaced to create the projections extending from surface 48. The two members are placed in the fixture and then welded together as described. During welding, the projections melt, and some of the melt can flow into holes 56. Other portions of the two members in the vicinity of the projections may also melt during the welding. After the melt has been allowed to solidify, the joined members are unclamped from the welding fixture. They are then assembled into counterbore 28.

The three-point arrangement of the projections at 120 degree increments around the co-axis of the members is advantageous because it will assure proper seating of the members for welding despite the presence of any slight surface irregularities in the confronting portions.

FIGS. 3-6 illustrate greater detail related to FIGS. 1 and 2.

FIGS. 7-12 illustrate alternate embodiments. Striking of one of the members with a tool to create the projections is only one way of creating the projections. The projections may be created by casting them into a member that is made by powered metal, metal injection molding, or heading. In each of the embodiments of FIGS. 7-12, the same numbers that were used in FIGS. 1 and 2 are repeated to designate corresponding elements. In all embodiments, the projections are formed of such height, extent, and location that the two members will accurately align, the confronting surface portions will not detrimentally distort, and the melt will not interfere with the resulting function and fit.

While a presently preferred embodiment of the invention has been illustrated and described, it should be appreciated that principles are applicable to other embodiments.

What is claimed is:

1. The combination of a seat member and a guide member for a fuel injector wherein on of said members has weld projections for engaging the other said members preparatory to joining of the two members together by conducting welding current through them to turn the projections into welds that join the two members, in which said one member comprises a corresponding depression immediately adjacent each weld projection, and in which said seat and guide members share a common main longitudinal axis, said one member comprises a frustoconical surface, each said corresponding depression is contained in said frustoconical surface, and each said weld projection adjoins the corresponding depression in a direction that is parallel with said main longitudinal axis.

2. The combination set forth in claim 1 in which said one member comprises an axially facing surface that adjoins said frustoconical surface, and each said weld projection projects from said axially facing surface in a direction that is parallel with said main longitudinal axis.

3. The combination set forth in claim 2 in which said one member is said guide member, said seat member comprises a frustoconical surface portion, and said weld projections are disposed to engage said frustoconical surface portion of said seat member.

4. The combination set forth in claim 3 in which there are three such weld projections, and corresponding depressions, arranged 120 degrees apart about said main longitudinal axis.

5. The combination set forth in claim 4 in which each said depression comprises a pointed hole.

6. The combination set forth in claim 1 in which said one member is said guide member, said seat member comprises a frustoconical surface portion, and said weld projections are disposed to engage said frustoconical surface portion of said seat member.

7. The combination set forth in claim 6 in which there are three such weld projections, and corresponding depressions, arranged 120 degrees apart about said main longitudinal axis.

8. The combination set forth in claim 1 in which there are three such weld projections, and corresponding depressions, arranged 120 degrees apart about said main longitudinal axis.

9. The combination of a seat member and a guide member for a fuel injector wherein one of said members has weld projections for engaging the other of said member preparatory to joining the two members together by conducting welding current through them to turn the projections into welds that join the two members, in which said one member comprises a corresponding depression immediately adjacent each weld projection, and in which each said depression comprises a pointed hole.

10. The combination set forth in claim 9 in which said seat and guide members share a common main longitudinal axis, said one member comprises a frustoconical surface, each said corresponding depression is contained in said frustoconical surface, and each said weld projection adjoins the corresponding depression in a direction that is parallel with said main longitudinal axis.

11. The combination set forth in claim 10 in which said one member comprises an axially facing surface that adjoins said frustoconical surface, and each said weld projection projects from said axially facing surface in a direction that is parallel with said main longitudinal axis.

12. The combination set forth in claim 11 in which there are three such weld projections, and corresponding depressions, arranged 120 degrees apart about said main longitudinal axis.

13. The combination set forth in claim 10 in which there are three such weld projections, and corresponding depressions, arranged 120 degrees apart about said main longitudinal axis.

14. The combination set forth in claim 9 in which there are three such weld projections and corresponding depressions, arranged 120 degrees apart about a main longitudinal axis that is shared by said seat and guide members.

15. The combination set forth in claim 14 in which said one member comprises an axially facing surface that adjoins a frustoconical surface, and each said weld projection projects from said axially facing surface in a direction that is parallel with said main longitudinal axis.

16. The combination of a seat member and a guide member for a fuel injector wherein one of said members has weld projections for engaging the other of said members preparatory to joining of the two members together by conducting welding current through them to turn the projections into welds that join the two members, and in which said one member comprises an axially facing surface adjoining a frustoconical surface, and each said weld projection projects from said axially facing surface in a direction away from said frustoconical surface.

17. The combination set forth in claim 16 in which said one member is said guide member.

18. The combination set forth in claim 16 in which there are three of said weld projections arranged circumferentially about said one member.

19. The combination set forth in claim 16 in which said one member comprises, for each weld projection, a corresponding depression that is disposed in said frustoconical surface proximate the corresponding weld projection.

20. The combination set forth in claim 16 in which said other member comprises a frustoconical surface portion, and said weld projections are disposed to engage said frustoconical surface portion of said other member.

* * * * *